United States Patent
Clark et al.

(10) Patent No.: US 12,410,748 B1
(45) Date of Patent: Sep. 9, 2025

(54) BOOST COMPRESSOR AUGMENTATION FOR HYBRID ELECTRIC THERMAL MANAGEMENT SYSTEMS

(71) Applicant: RTX Corporation, Farmington, CT (US)

(72) Inventors: Thomas E. Clark, Wells, ME (US); Jung Muk Choe, Glastonbury, CT (US); Bryan Kupferman, Monroe, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/670,642

(22) Filed: May 21, 2024

(51) Int. Cl.
*F02C 6/08* (2006.01)
*F02C 7/18* (2006.01)
*F02C 9/18* (2006.01)

(52) U.S. Cl.
CPC ............. *F02C 6/08* (2013.01); *F02C 7/185* (2013.01); *F02C 9/18* (2013.01); *F05D 2260/213* (2013.01)

(58) Field of Classification Search
CPC .... F02C 6/08; F02C 7/185; F02C 9/18; F05D 2220/323; F05D 2260/213; F05D 2260/232; F23R 3/005; F02K 3/11; F02K 3/105; F02K 3/115
See application file for complete search history.

(56) References Cited

U.S. PATENT DOCUMENTS

| | | | | |
|---|---|---|---|---|
| 4,441,314 A * | 4/1984 | Fitton | ............... | F01D 11/24 |
| | | | | 60/266 |
| 5,261,228 A * | 11/1993 | Shuba | ............... | F01D 17/105 |
| | | | | 60/226.3 |
| 6,393,826 B1 * | 5/2002 | Yamanaka | ............... | F02C 7/18 |
| | | | | 60/728 |
| 8,671,686 B2 | 3/2014 | Pinkerton et al. | | |
| 9,487,300 B2 | 11/2016 | Klimpel et al. | | |
| 11,028,730 B2 | 6/2021 | Stearns et al. | | |
| 11,391,210 B2 | 7/2022 | Ribarov | | |
| 11,795,872 B2 | 10/2023 | Ajami et al. | | |
| 11,827,370 B1 | 11/2023 | Freer | | |
| 2009/0196736 A1 * | 8/2009 | Sengar | ............... | F02C 6/08 |
| | | | | 415/115 |
| 2010/0192593 A1 * | 8/2010 | Brown | ............... | F02C 7/14 |
| | | | | 701/100 |
| 2012/0045317 A1 * | 2/2012 | Saladino | ............... | F02C 6/08 |
| | | | | 415/145 |

(Continued)

*Primary Examiner* — Devon C Kramer
*Assistant Examiner* — Henry Ng

(57) ABSTRACT

A fan is disposed at an intake of a nacelle, and a gas turbine is contained within a first portion of the nacelle. The gas turbine includes compressor, combustor, and turbine stages through which a core stream of gas passes past the fan and past the compressor, combustor, and turbine stages. A first heat exchanger is disposed in a second portion of the nacelle, where a fan stream passes through the second portion of the nacelle. A first switching valve receives gas from the fan stream and directs the received gas to a second switching valve or the turbine stage. The second switching valve directs gas to a boost compressor and receives gas from the first switching valve or a high pressure bleed from the compressor stage. A third switching valve receives gas from the boost compressor and directs compressed gas to the first heat exchanger or the turbine stage.

18 Claims, 6 Drawing Sheets

(56) References Cited

U.S. PATENT DOCUMENTS

| | | | | |
|---|---|---|---|---|
| 2012/0216545 A1* | 8/2012 | Sennoun | F02K 3/115 |
| | | | 60/785 |
| 2013/0040545 A1* | 2/2013 | Finney | B64D 13/06 |
| | | | 454/71 |
| 2013/0269357 A1* | 10/2013 | Wichmann | F02C 3/34 |
| | | | 60/726 |
| 2013/0269360 A1* | 10/2013 | Wichmann | F02C 6/18 |
| | | | 60/773 |
| 2016/0369705 A1* | 12/2016 | Mackin | F02C 6/08 |
| 2017/0016395 A1* | 1/2017 | Kim | F02C 6/08 |
| 2017/0074171 A1* | 3/2017 | Takenaka | F02C 7/224 |
| 2017/0106985 A1* | 4/2017 | Stieger | B64D 13/02 |
| 2017/0113808 A1* | 4/2017 | Bond | B64D 41/00 |
| 2017/0138201 A1* | 5/2017 | Takata | F01D 5/085 |
| 2018/0080383 A1* | 3/2018 | Snape | F02C 6/08 |
| 2018/0163627 A1* | 6/2018 | Suciu | F02C 9/18 |
| 2018/0258859 A1* | 9/2018 | Suciu | F02K 3/115 |
| 2018/0266330 A1* | 9/2018 | Widener | F23R 3/045 |
| 2019/0162121 A1* | 5/2019 | Staubach | F02C 7/32 |
| 2019/0353103 A1* | 11/2019 | Roberge | F02C 7/32 |
| 2019/0360349 A1* | 11/2019 | Schwarz | F02C 3/073 |
| 2019/0360398 A1* | 11/2019 | Qiu | F02C 7/14 |
| 2020/0232394 A1* | 7/2020 | Herring | F02C 7/32 |
| 2021/0061476 A1* | 3/2021 | Van Den Ende | F02C 7/18 |
| 2021/0348564 A1* | 11/2021 | Mackin | F02C 7/047 |
| 2022/0185485 A1 | 6/2022 | Galzin et al. | |
| 2022/0235707 A1* | 7/2022 | Millhaem | F02C 6/08 |
| 2022/0397062 A1* | 12/2022 | Terwilliger | F02C 7/141 |
| 2023/0228214 A1* | 7/2023 | Miller | F02K 3/04 |
| | | | 60/785 |
| 2023/0399111 A1* | 12/2023 | Takami | B64D 35/00 |
| 2024/0003293 A1* | 1/2024 | Takami | F02C 9/18 |

\* cited by examiner

BOOST COMPRESSOR AUGMENTATION FOR HYBRID ELECTRIC THERMAL MANAGEMENT SYSTEMS

TECHNICAL FIELD

This disclosure relates generally to gas turbines. More specifically, this disclosure relates to boost compressor augmentation for hybrid electric thermal management systems.

BACKGROUND

Industry-wide design trends for gas turbine engines have included a general push towards incorporating hybrid electric systems, which use high-power motor generators and motor controllers powered by gas turbine aircraft engines. However, this presents new challenges associated with the management of waste heat. Because specified operating requirements for aircraft, such as maximum hot day (MHD) requirements, have not changed, the fact that larger electric generators create more heat can present significant technical problems in rejecting the increased excess heat. This can be particularly true during certain operating modes, such as taxiing, landing, and idling, when the volume of air passing through nacelles is low. While increasing the size of a hybrid electric system's heat exchangers to better reject excess heat in low air-flow operating conditions may solve the problem of increasing the system's heat management capacity in theory, this is typically not a viable solution due in part to increased weight and drag associated with larger heat exchangers.

SUMMARY

This disclosure relates to boost compressor augmentation for hybrid electric thermal management systems.

In a first embodiment, a system includes a nacelle and a fan disposed at an intake of the nacelle. The system also includes a gas turbine, where the gas turbine is contained within a first portion of the nacelle. The gas turbine includes a compressor stage, a core stage, and a turbine stage through which a core stream of gas passes through the fan, the compressor stage, the combustor stage, and the turbine stage. The system further includes a first heat exchanger disposed in a second portion of the nacelle, where a fan stream passes through the second portion of the nacelle. In addition, the system includes a boost compressor, a first switching valve, a second switching valve, and a third switching valve. The first switching valve is configured to receive gas from the fan stream, direct the received gas to the second switching valve in an "a" position, and direct the received gas to the turbine stage in a "b" position. The second switching valve is configured to direct gas to the boost compressor, receive gas from the first switching valve in an "a'" position, and receive gas from a high pressure bleed from the compressor stage in a "b'" position. The third switching valve is configured to receive gas from the boost compressor, direct compressed gas to the first heat exchanger in an "a" position and direct the compressed gas to the turbine stage in a "b" position.

In a second embodiment, a method includes operating a fan disposed at an intake of a nacelle and a gas turbine contained within a first portion of the nacelle. The gas turbine includes a compressor stage, a combustor stage, and a turbine stage through which a core stream of gas passes through the fan, the compressor stage, the combustor stage, and the turbine stage. The method also includes operating a first heat exchanger disposed in a second portion of the nacelle, where a fan stream passes through the second portion of the nacelle. The method further includes using a first switching valve to receive gas from the fan stream and to direct the received gas to a second switching valve in an "a" position or to the turbine stage in a "b" position. The method also includes using the second switching valve to direct gas to a boost compressor and to receive gas from the first switching valve in an "a'" position or from a high pressure bleed from the compressor stage in a "b'" position. In addition, the method includes using a third switching valve receive gas from the boost compressor and direct compressed gas to the first heat exchanger in an "a" position or to the turbine stage in a "b" position.

Examples of systems according to this disclosure include systems wherein the system further comprises a controller configured to switch the system between a low-flow mode and a flight mode, wherein in the low-flow mode, the first switching valve is in the "a" position, the second switching valve is in the "a'" position, and the third switching valve is in the "a''" position and wherein in the flight mode, the first switching valve is in the "b" position, the second switching valve is in the "b'" position, and the third switching valve is in the "b''" position.

Examples of systems according to this disclosure include systems comprising a second heat exchanger, wherein gas from the boost compressor passes the second heat exchanger in the low-flow mode.

Examples of systems according to this disclosure include systems wherein the controller is configured to determine at least one of: an airspeed below a threshold airspeed or an activation of a weight on wheels switch, and in response to the determination, switch the system to the low-flow mode; or determine at least one of: an airspeed above a threshold airspeed or a deactivation of a weight on wheels switch, and in response to the determination, switch the system to the flight mode.

Examples of systems according to this disclosure include systems wherein the boost compressor is an electrically powered compressor; and the boost compressor is configured to be powered by one or more of an aircraft battery, high spool power extraction from the gas turbine, or low spool power extraction from the gas turbine.

Examples of systems according to this disclosure include systems, wherein the first heat exchanger comprises a body portion containing one or more channels for passage of a liquid coolant; a first inlet configured to admit moving gas from the fan stream; and a second inlet configured to admit compressed gas from the boost compressor.

Examples of systems according to this disclosure include systems, wherein the liquid coolant is one or more of water, fuel, or oil.

Examples of systems according to this disclosure include systems, wherein, in flight mode, the first switching valve is configured to direct gas from the fan stream to one or more active clearance control systems in the turbine stage.

Examples of systems according to this disclosure include systems wherein, in flight mode, the third switching valve is configured to provide compressed air to a turbine cooling and leakage air ("TCLA") boost system.

Examples of systems according to this disclosure include systems wherein the controller is configured to progressively switch from the low-flow mode to the flight mode such that compressed gas from the boost compressor is provided to both the first heat exchanger and the turbine stage of the gas turbine.

Examples of methods according to this disclosure include methods comprising switching between a low-flow mode and a flight mode wherein, in the flight mode, the first switching valve is in the "b" position, the second switching valve is in the "b'" position, and the third switching valve is in the "b'" position.

Examples of methods according to this disclosure include methods comprising operating a second heat exchanger, wherein, in the low-flow mode, gas from the boost compressor passes the second heat exchanger.

Examples of methods according to this disclosure include methods comprising switching to the low-flow mode based on a determination of one or more of: an airspeed below a threshold airspeed or an activation of a weight on wheels switch and switching to the flight mode based on a determination of one or more of: an airspeed above a threshold airspeed or a deactivation of a weight on wheels switch.

Examples of methods according to this disclosure include methods wherein the boost compressor is an electrically powered compressor, and the boost compressor is powered by one or more of an aircraft battery, high spool power extraction from the gas turbine, or low spool power extraction from the gas turbine.

Examples of methods according to this disclosure include methods wherein the first heat exchanger comprises a body portion containing one or more channels for passage of a liquid coolant, a first inlet configured to admit moving gas from the fan stream and a second inlet configured to admit compressed gas from the boost compressor.

Examples of methods according to this disclosure include methods wherein the liquid coolant is one or more of water, fuel, or oil.

Examples of methods according to this disclosure include methods wherein, in flight mode, the first switching valve is configured to direct gas from the fan stream to one or more active clearance control systems in the turbine stage.

Examples of methods according to this disclosure include methods wherein, in flight mode, the third switching valve is configured to provide compressed air to a turbine cooling and leakage air ("TCLA") boost system.

Examples of methods according to this disclosure include methods comprising progressively switching from the low-flow mode to the flight mode such that compressed gas from the boost compressor is provided to both the first heat exchanger and the turbine stage of the gas turbine.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1A:
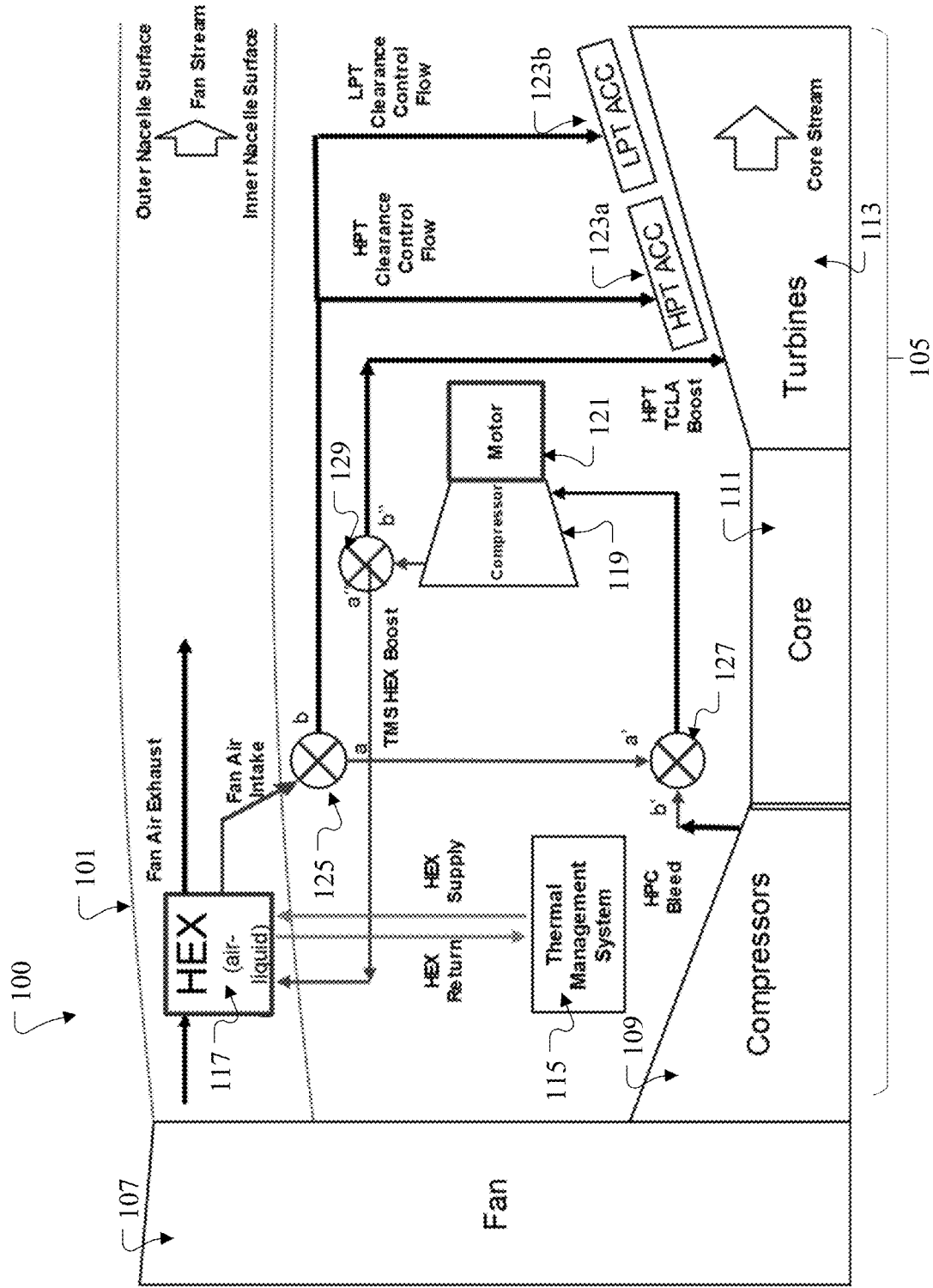
FIGS. 1A-1D illustrate an example system according to embodiments of this disclosure.
Figure 1B:
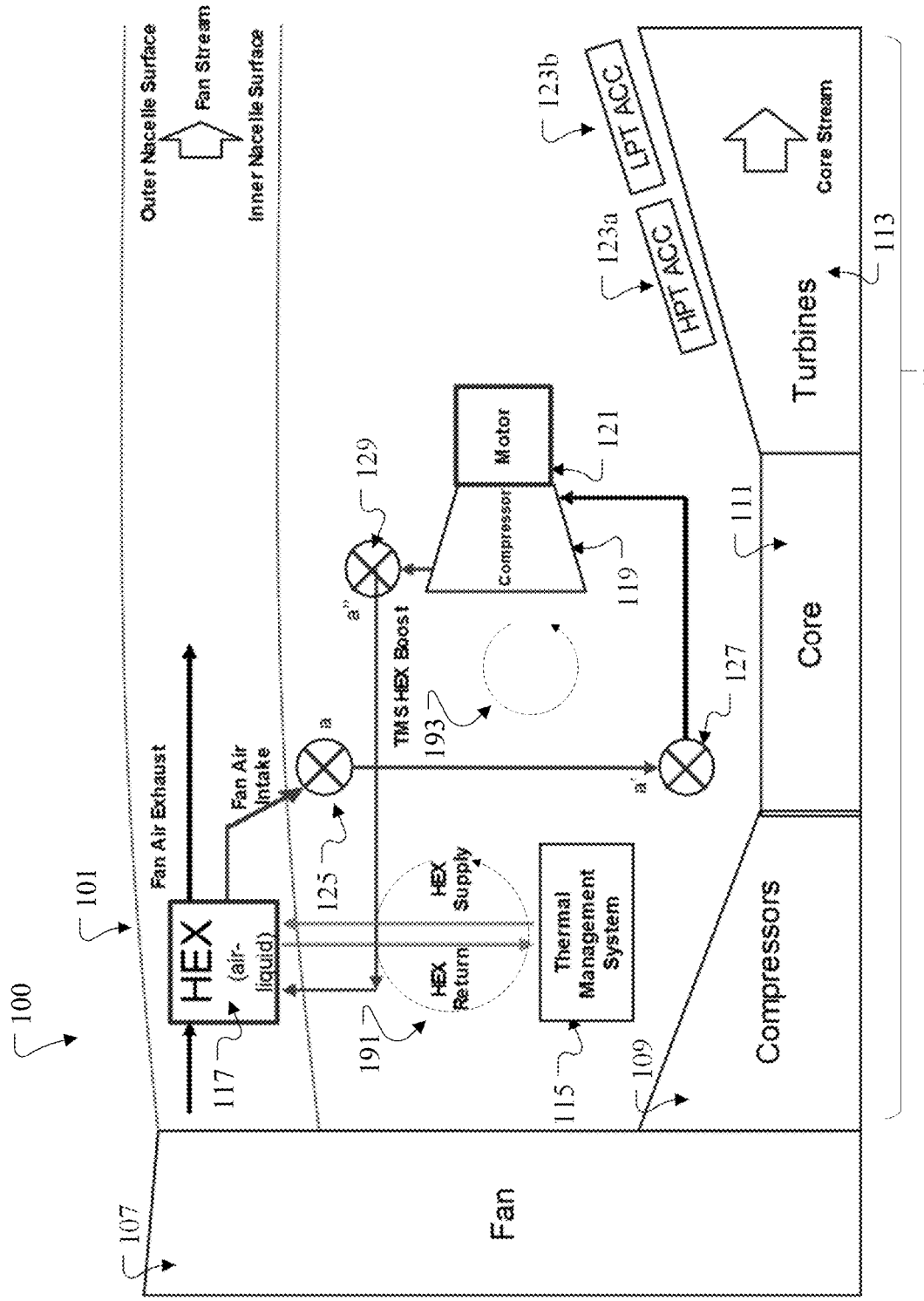
Figure 1C:
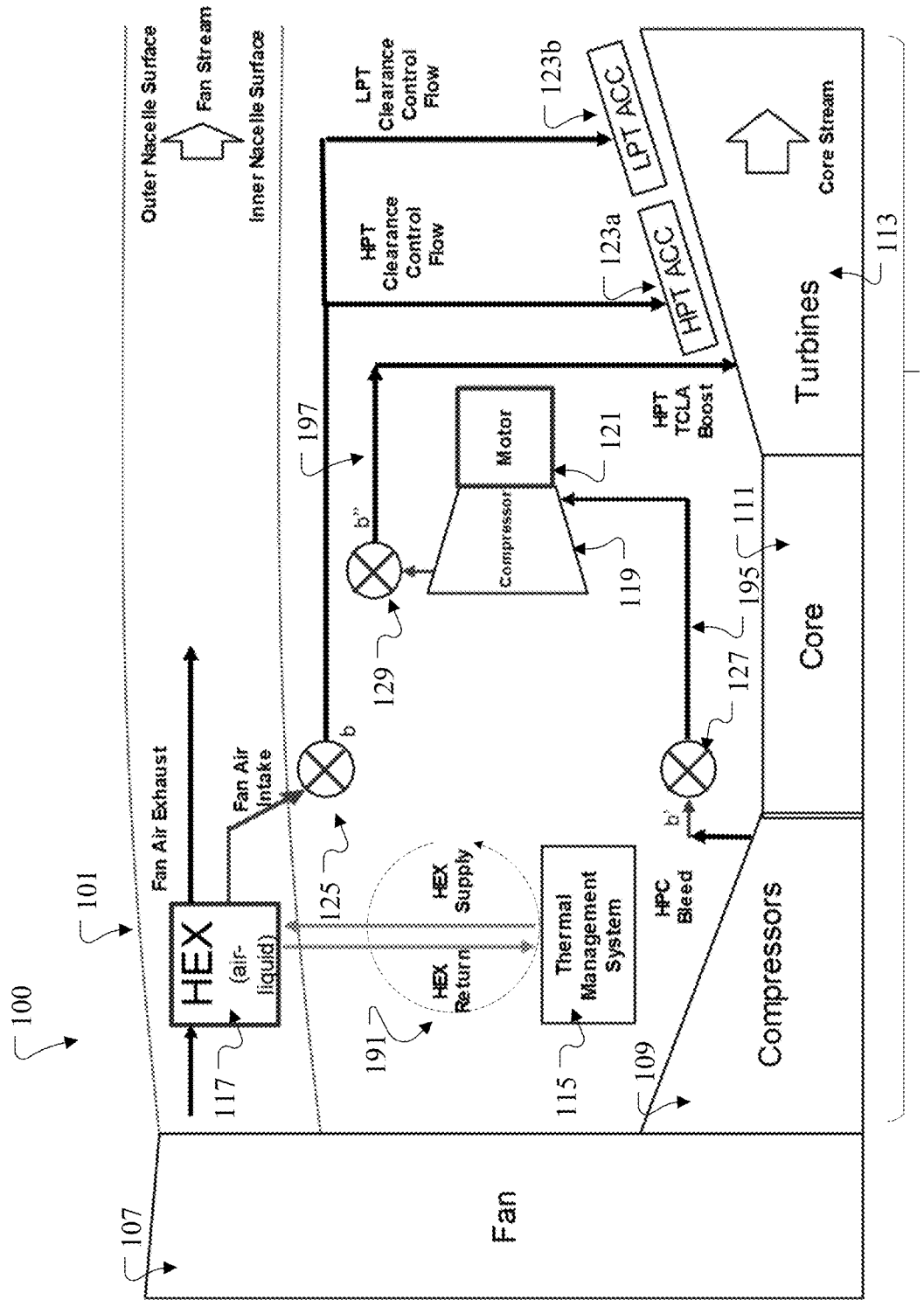
Figure 1D:
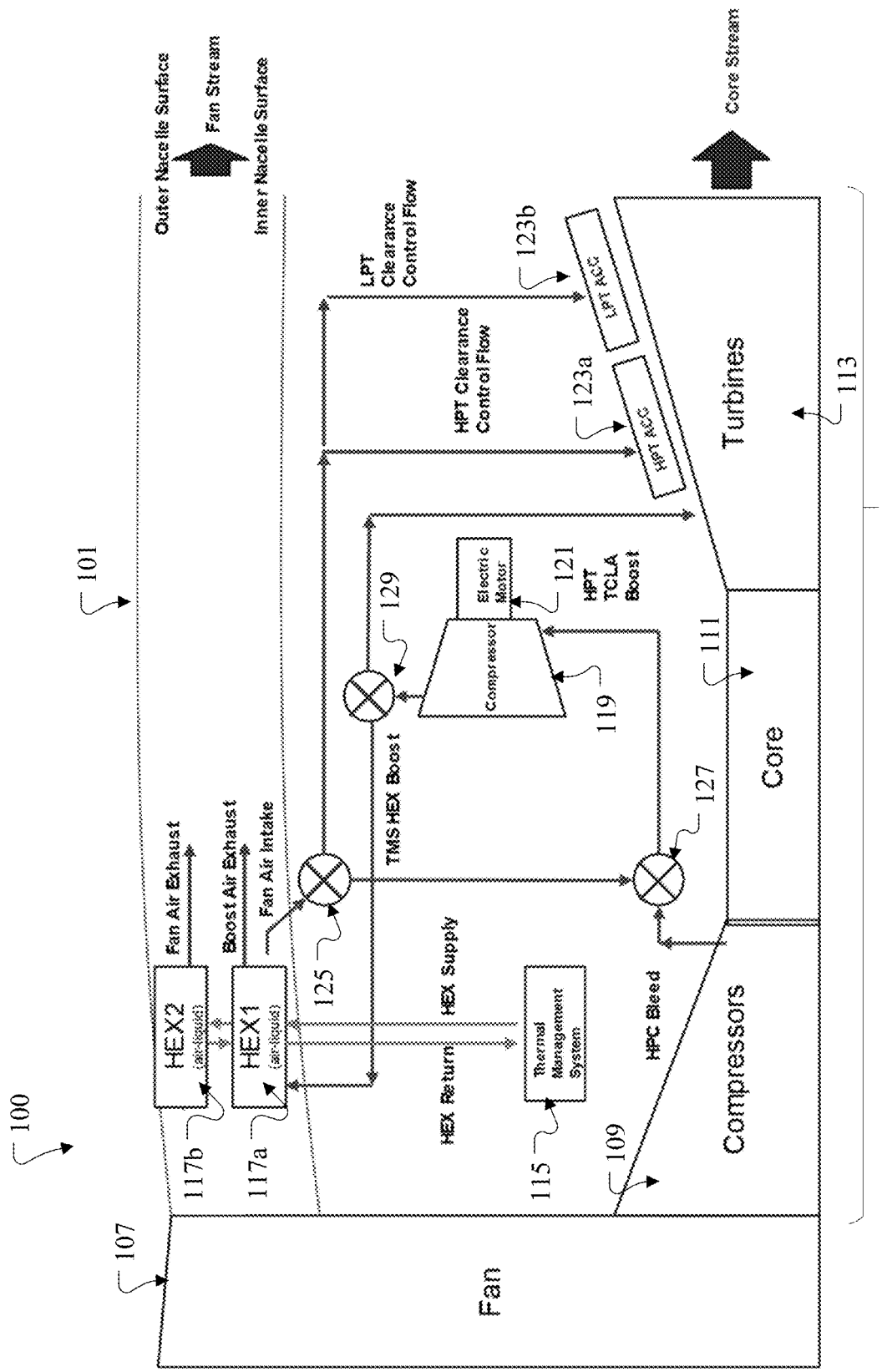
Figure 2:
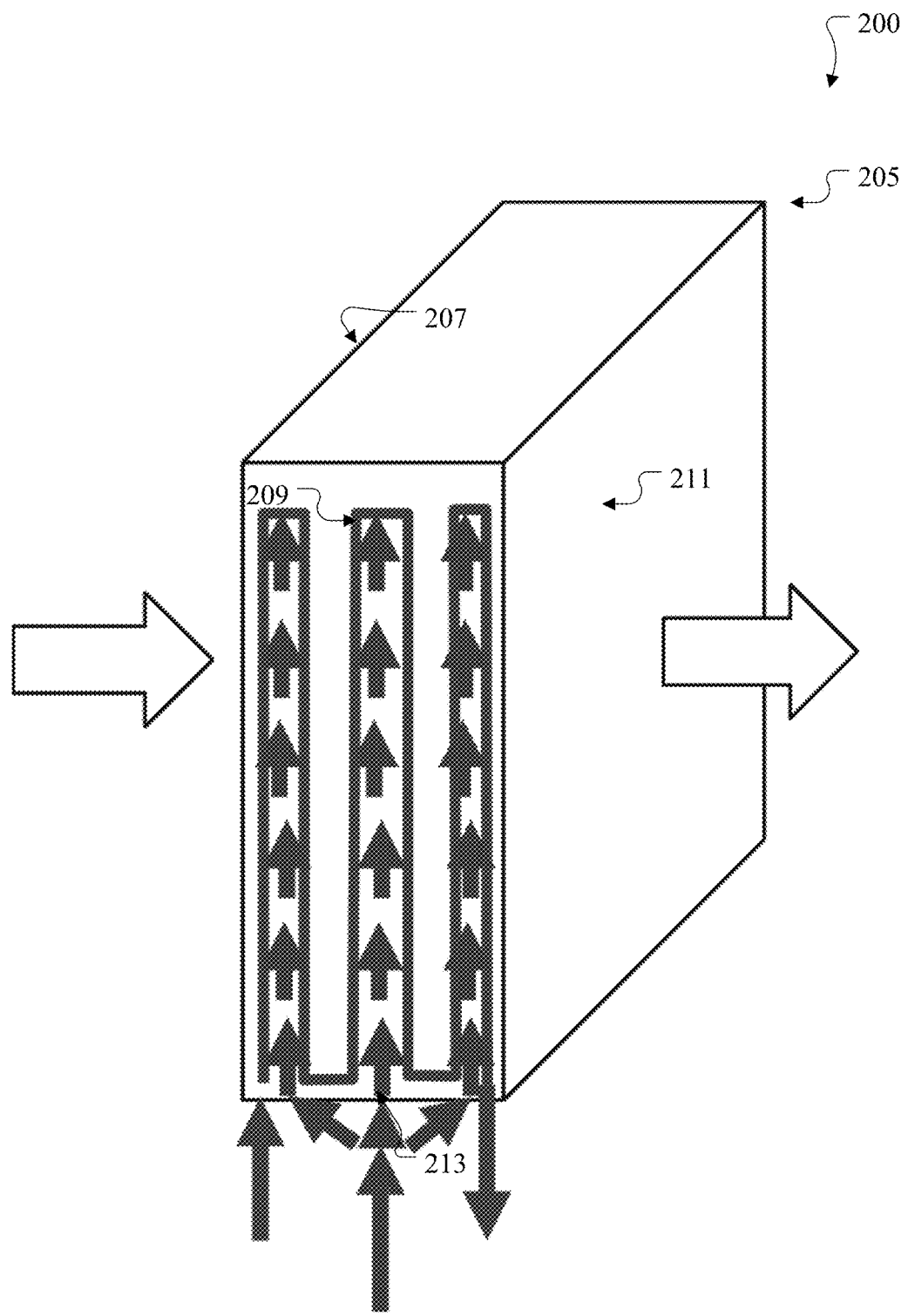
FIG. 2 illustrates an example dual-mode heat exchanger according to embodiments of this disclosure.
Figure 3:
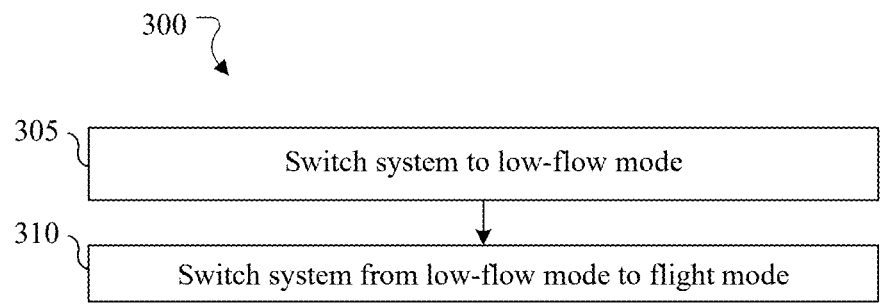
FIG. 3 illustrates an example method according to this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, while enhancing the overall performance of an aircraft and providing greater electrification (such as higher voltages) for onboard main buses, the performance gains provided modern hybrid electric systems for aircraft come at the expense of greater waste heat produced by the electrical generation apparatus. While not an issue during the bulk of an aircraft's use cycle (such as cruising at altitude), managing and rejecting the added waste heat can present significant problems during descent, taxiing and idling, particularly when the outside temperature approaches the MHD limit specified for the aircraft.

Further, as previously noted, installing more or larger heat exchangers ("HEX") to reject heat from the hybrid electrical system is, for many applications, not a viable option, in that it requires redesigning the engine nacelles (which in turn can affect the design of other components of the airframe), or a decidedly sub-optimal option, in that it requires adding the weight and drag of an enlarged heat exchanger assembly.

Embodiments according to this disclosure reconcile the technical challenge of rejecting the additional waste heat created by improvements in hybrid electric power systems while remaining within the spatial constraints of existing nacelle form factors, and, at the same time, not incurring the weight penalties associated with larger heat exchangers. More specifically, embodiments according to the present disclosure leverage the supply of compressed air available for cooling of turbine blades to augment the airflow over an existing heat exchanger assembly during low-airflow operating conditions in which the volume of cool air passing over the heat exchangers due to the normal operation of the gas turbine and (for taxiing and landing situations) the air being forced into the heat exchanger through the forward motion of the aircraft, is insufficient to draw off the heat accumulating in the thermal management system. Put differently, embodiments according to this disclosure augment the capacity of an existing heat exchanger to draw off system heat by redirecting compressed air from an existing air supply (for example, an air supply to a turbine cooling and leakage air ("TCLA") boost system) to the heat exchanger during low-airflow operating conditions.

FIGS. 1A through 1D illustrate example embodiments of a system incorporating boost compressor augmentation for hybrid electric thermal management systems according to this disclosure. For consistency and convenience of cross-reference, elements common to more than one of FIGS. 1A-1D are numbered similarly.

Referring to the illustrative example of FIG. 1A, all of the components and possible connections between components of an example system 100 are shown in the figure. The examples shown in FIGS. 1B and 1C show connections for the passage of working fluids which support two different modes of operation of system 100.

As shown in the figures, system 100 comprises a nacelle 101, wherein nacelle 101 can be a nacelle for a gas turbine (for example, a turbofan 105) disposed on a wing or fuselage of an airframe. As shown in FIG. 1A, nacelle 101 comprises an intake fan 107 at a forward orifice of nacelle 101. In many embodiments, intake fan 107 is driven by a low-pressure driveshaft (also referred to as a "low spool") of turbofan engine 105.

When driven, intake fan 107 pulls air into nacelle 101, wherein a first portion of the air drawn into nacelle 101 forms a core stream of gas, which is further drawn into turbofan 105, passing through a compressor stage 109, a combustor stage 111, and then a turbine stage 113. The operation of turbofan 105 both provides mechanical energy in the form of thrust (from hot gas being ejected from the turbine stage) to propel the aircraft, as well as rotational energy from the combustion cycle driving one or more driveshafts of turbofan 105. The rotational energy drawn from the one or more driveshafts of turbofan 105 can be used to drive one or more electrical generators. Skilled artisans will appreciate that the electrical generators and other electrical apparatus necessarily generate heat. Accordingly, system 100 can include one or more thermal management systems 115, which provide for the circulation of a liquid coolant (for example, air, water, or oil) past heat-generating electrical apparatus. As shown in the figure, thermal management system 115 directs liquid coolant in a circuit which includes the heat-generating apparatus, and one or more heat exchangers 117.

The one or more heat exchangers 117 can be disposed in a second portion of nacelle 101, wherein outside air is drawn in by fan 107 and directed through the second portion nacelle 101 to form a fan stream. In contrast to the gases moving through turbofan 105, which are forced through the system by the action of the turbofan 105, the air moving through fan stream moves passively, and is neither compressed nor combusted during its passage through the second portion of nacelle 101. When the aircraft is cruising at speed, fan 107 moves comparatively large volumes of air over heat exchanger 117, which is disposed in the fan stream. These comparatively large volumes of air ensure that heat exchanger 117 can, under most operating conditions, readily reject the excess heat generated by an electrical apparatus. In simpler terms, when the aircraft of which system 100 is a part is moving quickly and at altitude, there is abundant very cold air for drawing off excess heat through heat exchanger 117.

However, when the aircraft of which system 100 is a part is moving comparatively slowly (for example, during taxiing, or idling), fan 107 draws in comparatively smaller volumes of (potentially warmer) air into the fan stream than when cruising at altitude. The diminished air flow in such operating conditions means that waste heat can more readily accumulate in heat exchanger 117-a technical problem which embodiments according to this disclosure address without increasing (and in some cases, decreasing) the overall mass and drag of system 100.

As shown in the figures, system 100 further comprises a boost compressor 119, which is configured to receive uncompressed gas and output compressed gas. In hybrid systems, or systems with large amounts of electrification, boost compressor 119 is an electrically driven compressor, and comprises electric motor 121. Electric motor 121 can be driven from a plurality of power sources, including, without limitation, an onboard electrical battery, a generator connected to a low spool (for example, a driveshaft connected to fan 107) or a generator connected to a high spool (for example, a driveshaft connected to turbine stage 113). In some embodiments, boost compressor 119 can be the compressor for an existing component or sub-system of system 100, such as a turbine cooling and leakage air ("TCLA") boost compressor, which when the aircraft of which system 100 is a part is cruising at altitude, operates to provide a supply of comparatively cool air to cool turbine stage 113 and to provide a boost of air to offset power losses due to leakage (for example, leakage around turbine blade tips). During low-flow situations, TCLA boost is generally not required as turbofan 105 is operating at only a fraction of its peak power. Thus, where boost compressor 119 is a TCLA boost compressor, is can often be idle or operating at low power during low-flow operating situations.

As shown in the figures. system 100 further comprises one or more active clearance controls 123a and 123b, which pass a flow of cool air from the fan stream to turbine stage 113 to provide additional cooling to turbine stage 113 to control the clearance between fan tips and the air seals of turbine stage 113.

As shown in the figures, system 100 can include a first switching valve 125, a second switching valve 127 and a third switching valve 129, which can each be actuated between at least two positions by a controller (for example, a microcontroller in thermal management system 115). According to embodiments, first switching valve 125 is configured to receive air from the fan stream, and in a first position (shown as "a" in the figures), direct the air to second switching valve 127. When in a second position (shown as "b" in the figures), first switching valve 125 directs the air received from the fan stream to turbine stage 113. In this illustrative example, when first switching valve 125 is in its second position, fan stream air is directed to a first, high pressure turbine active clearance control 123a and a second, low pressure turbine active clearance control 123b.

Second switching valve 127 is configured to direct air to boost compressor 119. In a first position (shown as a' in the figures), second switching valve 127 receives air from first switching valve 125. In a second position (shown as b' in the figures), second switching valve 127 receives compressed air from a high pressure compressor bleed port of compressor stage 109 of turbofan 105.

Third switching valve 129 is configured to receive compressed air from boost compressor 119. In a first position (shown as a" in the figures), third switching valve 129 directs the compressed air to heat exchanger 117. In this way, additional cool air is made available to carry off excess waste heat in the cooling liquid passing through heat exchanger 117. In a second position (shown as b" in the figures), third switching valve 129 directs the compressed air to turbine stage 113. In this illustrative example, when in its second position, third switching valve 129 directs compressed air to a TCLA boost for turbine stage 113.

According to various embodiments, one or more controllers (for example, a controller provided as part of thermal management system 115) can switch first, second and third switching valves 125-129 together to provide a low-flow mode of operation and a flight mode of operation, according to the current operating state of the aircraft. In the low-flow mode, each of switching valves 125-129 are in the positions shown in the figures as a, a' and a", wherein gas from the high pressure bleed port of compressor stage 109 is provided, via boost compressor 119 to heat exchanger 117. Additionally, the controller can switch first, second and third switching valves 125-129 simultaneously to the positions shown as b, b' and b" in the figures to provide a flight mode of operation for via conditions in which large volumes of fast-moving, cool air are available to reject heat from heat exchanger 117, and the immediate performance concern is to maximize the efficiency of turbofan 105. In some embodiments, the controller can be configured to switch between flight mode and low-flow mode based on a determination that one or more operating conditions is met. For example, in response to detecting one or more of: an airspeed dropping below a threshold speed (for example, 160 knots) or triggering of a weight on wheels switch, the controller can be configured to fully (or, in the case of progressive switching) progressively switch first, second and third switching valves 125-129 from a flight mode to a low-flow mode.

Similarly, in response to detecting one or more of the airspeed crossing above a threshold speed, or deactivation of a weight on wheels switch, the controller can be configured to either fully or progressively switch first, second and third switching valves 125-129 to flight mode. In embodiments wherein switching between low-flow and flight mode is done progressively, the switching can be performed over a predetermined transition range. For example, the system can be configured to gradually switch from a fully low-flow mode to a fully flight mode as the airspeed of the aircraft increases over a predetermined speed window (for example, 120 knots to 160 knots).

Referring to the illustrative example of FIG. 1B, a second view of system 100, in which only the connections supporting the low-flow mode of system 100 are shown, is provided. As shown in FIG. 1B, when in low-flow mode, there are two cycles of working fluids. In a first cycle 191, liquid coolant (for example, water, fuel or oil) is circulated between thermal management system 115 and heat exchanger 117, such that working fluid heated by the electrical components is carried to heat exchanger 117, where a combination of compressed air from boost compressor 119 and any available air from the fan stream passes over the exterior of heat exchanger 117 to cool the working fluid, which is then returned to thermal management system 115.

When in low-flow mode, air from the fan stream moves in cycle 193, wherein it is taken from the fan stream, directed to boost compressor 119 via first switching valve 125 and second switching valve 127, and then further directed by third switching valve 129 to provide an auxiliary supply of cooling air to pass over heat exchanger 117, following which it the cycled air is returned to the fan stream.

It should be noted that the modes of operation described with reference to FIGS. 1B and 1C are not mutually exclusive, and that switching valves 125-129 can also be configured such that the output of boost compressor 119 can be provided to both turbine stage 113 and heat exchanger 117. For example, as the aircraft transitions from its initial climb to cruising, thermal management system 115 may progressively actuate switching valves 125-129 to increasingly divert the output of boost compressor 119 to turbine stage 113 (for example, to a TCLA stage), rather than performing a hard switch between low-flow mode and flight mode.

Referring to the illustrative example of FIG. 1C, a third view of system 100, connections supporting a flight mode are shown, is provided. Referring to the illustrative example of FIG. 1C, in addition to first cycle 191, switching valves 125-129 are configured to provide a first flow 195, taking compressed air from the high pressure compressor bleed port of compressor stage 109, and passing it to the TCLA boost via boost compressor 119, and a second flow 197, wherein air from the fan stream is directed, via first switching valve 125 to first and second active clearance controls 123a and 123b.

While this disclosure notes that the technical and practical benefits of using the outputs of existing onboard compressors to increase the heat rejection capacity of a thermal management system without the potential weight and design penalties or replacing an existing heat exchanger or otherwise changing an existing heat exchanger configuration, the present disclosure should be construed as disclaiming embodiments which incorporate additional heat exchangers or otherwise alter an existing heat exchanger architecture. As shown in FIG. 1D, instead of a unitary heat exchanger 117 (as shown in FIGS. 1A-1C), system 100 can, instead, have a first heat exchanger 117A and a second heat exchanger 117B, wherein second heat exchanger 117B receives cooling air exclusively from the fan stream within nacelle 101, while first heat exchanger 117A can also receive cooling air from boost compressor 119.

FIG. 2 illustrates an example of a dual mode heat exchanger 200 according to embodiments of this disclosure. Referring the explanatory example of FIG. 2, dual mode heat exchanger 200 comprises a body 205, including a first air inlet 207 and an air exhaust 211. One or more coolant channels 209 (for example, uninsulated tubes of conductive material, such as aluminum) pass within body 205. Dual mode heat exchanger 200 also includes an air exhaust 211, and a second air inlet 213. Like heat exchanger 117 in FIGS. 1A-1C, dual mode heat exchanger can be disposed in a portion of a nacelle downstream of a turbine fan, and through which a fan flow of air is passively fed to first air inlet 207. In some embodiments, first air inlet 207 comprises an orifice surrounding the coolant tubes and comprising a plurality of fins connected to coolant channels 209, wherein the fins operate to increase the surface area over which the fan flows. Second air inlet 213 is connected to a line fed by a switching valve of the system (for example, third switching valve 129) and is configured to receive compressed air from a boost compressor when the dual mode hybrid electric system is operating in a low flow mode. Both the air admitted to dual mode heat exchanger 200 via first air inlet 207 and second air inlet 213 exit dual mode heat exchanger 200 via air exhaust 211.

FIG. 3 illustrates operations of an example method 300 of operating a system (for example, system 100 in FIGS. 1A-1D) according to various embodiments of this disclosure.

According to various embodiments, at operation 305, a system is switched to a low-flow mode. The system includes a nacelle (for example, nacelle 101), a fan (for example, fan 107) disposed at an intake of the nacelle, a gas turbine (for example, turbofan 105), wherein the gas turbine is contained within a first portion of the nacelle, and the gas turbine comprises a compressor stage, a combustor stage and a turbine stage, through which a core stream of gas passes through the fan, the compressor stage, the combustor stage and the turbine stage, a first heat exchanger (for example, heat exchanger 117) disposed in a second portion of the nacelle, a boost compressor (for example, boost compressor 119), a first switching valve (for example, first switching valve 125), a second switching valve (for example, second switching valve 127), and a third switching valve (for example, third switching valve 129), wherein the first switching valve is configured to receive gas from the fan stream, and in an "a" position, direct the received gas to the second switching valve, and in a "b" position, direct the received gas to the turbine stage, wherein the second switching valve is configured to direct gas to the boost compressor, and in an "a'" position, receive gas from the first switching valve, and in a "b'" position, receive gas from a high pressure bleed from the compressor stage, and wherein the third switching valve is configured to receive gas from the boost compressor, and in an "a''" position, direct compressed gas to the first heat exchanger, and in a "b''" position, direct the compressed gas to the turbine stage, switching the system to a low-flow mode, wherein the first switching valve is in the "a" position, the second switching valve is in the "a'" position, and the third switching valve is in the "a''" position. At operation 305, the first, second and third switching valves are switched to the a, a', and a'' positions respectively.

At operation 310, the system is switched from the low-flow mode to flight mode, such that the output of the boost compressor is directed to the turbine stage of the gas turbine. According to certain embodiments, operation 310 can be performed by switching the first, second and third switching valves to the b, b' and b" positions respectively.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims. For example, while described as a gas turbine engine throughout, it is understood that the present disclosure is applicable with any type of turbine engine, such as that fueled with traditional hydrocarbon fuel or other non-traditional fuels, such as sustainable aviation fuel (SAF), liquid hydrogen (LH2) and/or the like.

What is claimed is:

1. A system comprising:
   a nacelle;
   a fan disposed at an intake of the nacelle;
   a gas turbine contained within a first portion of the nacelle, the gas turbine comprising a compressor stage, a combustor stage, and a turbine stage through which a core stream of gas passes through the fan, the compressor stage, the combustor stage, and the turbine stage;
   a first heat exchanger disposed in a second portion of the nacelle, wherein a fan stream passes through the second portion of the nacelle;
   a boost compressor;
   a first switching valve;
   a second switching valve; and
   a third switching valve;
   wherein the first switching valve is configured to receive gas from the fan stream, direct the received gas to the second switching valve in an "a" position, and direct the received gas to the turbine stage in a "b" position;
   wherein the second switching valve is configured to direct gas to the boost compressor, receive gas from the first switching valve in an "a'" position, and receive gas from a high pressure bleed from the compressor stage in a "b'" position; and
   wherein the third switching valve is configured to receive gas from the boost compressor, direct compressed gas to the first heat exchanger in an "a''" position and direct the compressed gas to the turbine stage in a "b''" position.

2. The system of claim 1, wherein:
   the system further comprises a controller configured to switch the system between a low-flow mode and a flight mode;
   in the low-flow mode, the first switching valve is in the "a" position, the second switching valve is in the "a'" position, and the third switching valve is in the "a''" position; and
   in the flight mode, the first switching valve is in the "b" position, the second switching valve is in the "b'" position, and the third switching valve is in the "b''" position.

3. The system of claim 2, wherein the controller is configured to:
   determine at least one of: an airspeed below a threshold airspeed or an activation of a weight on wheels switch, and in response to the determination, switch the system to the low-flow mode; or
   determine at least one of: an airspeed above a threshold airspeed or a deactivation of a weight on wheels switch, and in response to the determination, switch the system to the flight mode.

4. The system of claim 2, wherein, in flight mode, the first switching valve is configured to direct the gas from the fan stream to one or more active clearance control systems in the turbine stage.

5. The system of claim 2, wherein, in flight mode, the third switching valve is configured to provide the compressed gas to a turbine cooling and leakage air ("TCLA") boost system.

6. The system of claim 2, wherein the controller is configured to progressively switch from the low-flow mode to the flight mode such that the compressed gas from the boost compressor is provided to both the first heat exchanger and the turbine stage of the gas turbine.

7. The system of claim 1, wherein:
   the boost compressor is an electrically powered compressor; and
   the boost compressor is configured to be powered by one or more of an aircraft battery, a high spool power extraction from the gas turbine, or a low spool power extraction from the gas turbine.

8. The system of claim 1, wherein the first heat exchanger comprises:
   a body portion containing one or more channels for passage of a liquid coolant;
   a first inlet configured to admit moving gas from the fan stream; and a second inlet configured to admit the compressed gas from the boost compressor.

9. The system of claim 8, wherein the liquid coolant is one or more of water, fuel, or oil.

10. A method comprising:
operating a fan disposed at an intake of a nacelle and a gas turbine contained within a first portion of the nacelle, the gas turbine comprising a compressor stage, a combustor stage, and a turbine stage through which a core stream of gas passes through the fan, the compressor stage, the combustor stage, and the turbine stage;
operating a first heat exchanger disposed in a second portion of the nacelle, wherein a fan stream passes through the second portion of the nacelle;
using a first switching valve to receive gas from the fan stream and to direct the received gas to a second switching valve in an "a" position or to the turbine stage in a "b" position;
using the second switching valve to direct gas to a boost compressor and to receive gas from the first switching valve in an "a'" position or from a high pressure bleed from the compressor stage in a "b'" position; and
using a third switching valve to receive gas from the boost compressor and to direct compressed gas to the first heat exchanger in an "a''" position or to the turbine stage in a "b''" position.

11. The method of claim 10, further comprising:
switching between a low-flow mode and a flight mode; and
wherein, in the flight mode, the first switching valve is in the "b" position, the second switching valve is in the "b'" position, and the third switching valve is in the "b''" position.

12. The method of claim 11, further comprising:
switching to the low-flow mode based on a determination of one or more of: an airspeed below a threshold airspeed or an activation of a weight on wheels switch; and
switching to the flight mode based on a determination of one or more of: an airspeed above a threshold airspeed or a deactivation of a weight on wheels switch.

13. The method of claim 11, wherein, in flight mode, the first switching valve is configured to direct the gas from the fan stream to one or more active clearance control systems in the turbine stage.

14. The method of claim 11, wherein, in flight mode, the third switching valve is configured to provide the compressed gas to a turbine cooling and leakage air ("TCLA") boost system.

15. The method of claim 11, further comprising:
progressively switching from the low-flow mode to the flight mode such that the compressed gas from the boost compressor is provided to both the first heat exchanger and the turbine stage of the gas turbine.

16. The method of claim 10, wherein:
the boost compressor is an electrically powered compressor; and
the boost compressor is powered by one or more of an aircraft battery, a high spool power extraction from the gas turbine, or a low spool power extraction from the gas turbine.

17. The method of claim 10, wherein the first heat exchanger comprises:
a body portion containing one or more channels for passage of a liquid coolant;
a first inlet configured to admit moving gas from the fan stream; and
a second inlet configured to admit the compressed gas from the boost compressor.

18. The method of claim 17, wherein the liquid coolant is one or more of water, fuel, or oil.

* * * * *